United States Patent Office 3,019,222
Patented Jan. 30, 1962

3,019,222
THERAPEUTIC SUBSTANCES AND COMPOSITIONS
David Haler, West Weybridge, England, assignor to West Pharmaceutical Company Limited, Sussex, England, a company of Great Britain
No Drawing. Filed Sept. 1, 1959, Ser. No. 837,326
Claims priority, application Great Britain Sept. 9, 1958
5 Claims. (Cl. 260—242)

This invention relates to improvements in therapeutic substances and compositions.

It is known that various barbiturates have been used as sedatives, hypnotics and anaesthetics and it is an object of the present invention to provide novel compounds and compositions which will produce the same effect as the known barbiturates with the use of smaller barbiturate content. It is also an object of the invention to produce compounds and compositions containing certain hydantoin derivatives having similar advantages.

With this object in view the present invention provides new compounds which are complexes of a compound of the general formula:

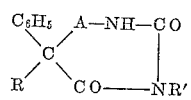

where A is a carbonyl group or a direct linkage, R is a methyl or ethyl group and R' is a hydrogen atom or a methyl group, and salts thereof, and aluminium diglycinate.

A preferred compound is the complex of phenobarbitone (5-phenyl-5-ethyl-barbituric acid) and aluminium diglycinate.

The invention is also applicable to other compounds falling within the aforesaid general formula, e.g. rutonal (5-phenyl-5-methyl-barbituric acid) and methoin (5-ethyl-3-methyl-5-phenyl-hydantoin).

The present invention also includes a process for the preparation of the new compounds wherein a water-soluble compound of the general formula:

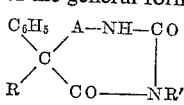

where A is a carbonyl group or a direct linkage, R is a methyl or ethyl group and R' is a hydrogen atom or a methyl group, and salts thereof, is reacted in the presence of water with aluminium diglycinate or with aluminium monoglycinate and glycine.

According to a preferred embodiment of the process of the invention sodium phenobarbitone is reacted in the presence of water with aluminium diglycinate or with aluminium monoglycinate and glycine.

Preferably 225 to 250 parts by weight of aluminium monoglycinate are reacted with 25 to 30 parts by weight of glycine and up to 16 parts by weight of sodium phenobarbitone.

The following examples illustrate the invention:

(1) 240 parts by weight of aluminium monoglycinate, 27 parts by weight of glycine and 10.8 parts by weight of sodium phenobarbitone were mixed in just sufficient water to form a stiff paste. Heat was evolved which dried the product, which was then made into tablets each containing an amount of the product equivalent to 10.8 mgm. (⅙ grain) of the sodium phenobarbitone used.

The tablets of Example 1 gave prolonged mild sedation starting within twenty minutes of administration and lasting up to twelve hours, and were equal in effect to conventional tablets containing one grain of phenobarbitone. Furthermore, the tablets did not produce pure hypnosis but were excellent sedatives.

The tablets were also useful for psychological, emotional, hormonal and psychomatic tensions. They had some use in the control of bowel spasms and other alimentary disorders and they play a major part in the basic treatment of insomnia.

(2) Example 1 was repeated but using 16.2 parts by weight of sodium phenobarbitone. This product was made into tablets each containing an amount of the product equivalent to 16.2 mgm. (¼ grain) of the sodium phenobarbitone used.

(3) 240 parts by weight of aluminium monoglycinate, 27 parts by weight of glycine and 10.8 parts by weight of methoin were mixed in just sufficient water to form a stiff paste. A large amount of heat was evolved which dried the product. It was then made into tablets, each containing an amount of the product equivalent to 10.8 mgms. (⅙ grain) of the methoin used. These tablets were found to be strongly anti-convulsant and were sedative in their effect. They are also useful in the control of epileptiform convulsions and in the treatment of epilepsy.

(4) 240 parts by weight of aluminium monoglycinate, 27 parts by weight of glycine and 16.2 parts by weight of sodium rutonal were mixed in just sufficient water to form a stiff paste. A large amount of heat was evolved which dried the product. It was then made into tablets, each containing an amount of the product equivalent to 16.2 mgms. of the sodium rutonal used. These tablets were found to be a well tolerated sedative and hypnotic.

The following experiments show that all the ingredients of the compositions of the present invention are necessary to produce the desired results:

*Experiment A*

180 mgms. of sodium hexa-metaphosphate, 10.8 mgms. of sodium phenobarbitone and 118.8 mgms. lactose were mixed in just sufficient water to form a stiff paste. No heat was evolved and experimentally the mixture produced diarrhoea and no enhancement of sedative action.

*Experiment B*

10.8 mgms. of sodium phenobarbitone and 118.8 mgms. of glycine were mixed in just sufficient water to form a stiff paste. No heat was evolved and no effects comparable with the product of Example I were observed on administration to patients.

*Experiment C*

10.8 mgms. of sodium phenobarbitone and 118.8 mgms. of aluminium glycinate were mixed in just sufficient water to form a stiff paste. No heat was evolved and no benefit was obtained on administration of the product to animals.

Various mixtures were also prepared using various quantities from 10.8 mgms. to 59.4 mgms. of sodium phenobarbitone per 118.8 mgms. of aluminium glycinate and mixing with just sufficient water to form a stiff paste. None of these produced any beneficial results.

Clinical trials have shown that the products of the present invention have very considerable advantages over the corresponding barbiturates and hydantoin derivatives.

Thus, for example, the product of Example 1 was used by a number of patients who experienced unpleasant aftereffects and hangover when taking sodium phenobarbitone and no after-effects occurred, although relaxed sleep was obtained. In other cases it was found that the product of Example 1 reduced the occurrence of rashes and other irritations although these occurred when taking sodium phenobarbitone. Finally, in many cases it was possible to reduce the amount of sodium phenobarbitone required to produce the desired effect by substituting the product of Example 1 or 2 for sodium phenobarbitone.

What I claim is:

1. Compounds which are complexes of aluminum diglycinate and a compound selected from the group consisting of compounds of the formula

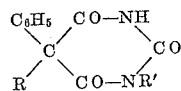

and compounds of the formula

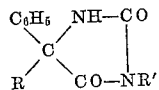

and sodium salts thereof, wherein R is an alkyl group having less than three carbon atoms and R' is selected from the group consisting of the hydrogen atom and the methyl group.

2. A complex of 5-phenyl-5-ethyl barbituric acid and aluminium diglycinate.

3. A process for the preparation of compounds which are complexes of aluminum diglycinate and a compound selected from the group consisting of compounds of the formula

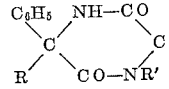

and compounds of the formula

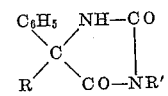

and sodium salts thereof, wherein R is an alkyl group having less than three carbon atoms and R' is selected from the group consisting of the hydrogen atom and the methyl group, which process comprises contacting a water-soluble compound as above defined in the presence of water with a substance selected from the group consisting of aluminum diglycinate and mixtures of aluminum monoglycinate and glycine.

4. A process for the preparation of a complex of 5-phenyl-5-ethyl barbituric acid and aluminium diglycinate which comprises contacting sodium 5-phenyl-5-ethyl barbituric acid in the presence of water with a substance selected from the group consisting of aluminium diglycinate and mixtures of aluminium monoglycinate and glycine.

5. A process for the preparation of a complex of 5-phenyl-5-ethyl barbituric acid and aluminium diglycinate which comprises contacting 225 to 250 parts by weight of aluminium monoglycinate with 25 to 30 parts by weight of glycine and up to 16 parts by weight of sodium 5-phenyl-5-ethyl barbituric acid.

No references cited.